US012800607B2

(12) United States Patent
Sanvito et al.

(10) Patent No.: US 12,800,607 B2
(45) Date of Patent: Nov. 17, 2026

(54) FLOW METER AND ASSOCIATED METHOD

(71) Applicants: STMICROELECTRONICS INTERNATIONAL N.V., Geneva (CH); UNIVERSITA' DEGLI STUDI DI BERGAMO, BERGAMO (IT)

(72) Inventors: Stefano Sanvito, Sulbiate (IT); Marco Passoni, Cornate d'Adda (IT)

(73) Assignee: STMicroelectronics International N.V., Geneva (CH)

( * ) Notice: Subject to any disclaimer, the term of this patent is extended or adjusted under 35 U.S.C. 154(b) by 167 days.

(21) Appl. No.: 18/816,734

(22) Filed: Aug. 27, 2024

(65) Prior Publication Data

US 2026/0063659 A1 Mar. 5, 2026

(51) Int. Cl.
*G01P 5/24* (2006.01)

(52) U.S. Cl.
CPC .................................... *G01P 5/245* (2013.01)

(58) Field of Classification Search
CPC ............. G01N 29/024; G01N 2291/02; G01N 2291/102; G01P 5/245; G01P 5/241; G01F 1/667
See application file for complete search history.

(56) References Cited

U.S. PATENT DOCUMENTS

2012/0055239 A1 3/2012 Sinha
2015/0020608 A1* 1/2015 Chevrier ................ H02H 9/005 73/861.31
2016/0169721 A1 6/2016 Chevrier et al.
2016/0187172 A1* 6/2016 Gottlieb ................ G01N 11/08 73/152.32
2023/0243683 A1 8/2023 Klemm
2024/0011810 A1 1/2024 Fowler et al.

FOREIGN PATENT DOCUMENTS

CN 201795820 U 4/2011

OTHER PUBLICATIONS

Xiu, et al., "Development of Mems Airflow Volumetric Flow Sensing System with Single Piezoelectric Micromachines Ultrasonic Transducer (PMUT) Array", Micromachines, Nov. 15, 2022, 15 pages.

* cited by examiner

*Primary Examiner* — Jennifer Bahls
(74) *Attorney, Agent, or Firm* — Alston & Bird LLP

(57) ABSTRACT

In accordance with various embodiments of the present disclosure, a flow meter for determining a velocity of a fluid is provided. In some embodiments, the flow meter comprises a single-die steerable transducer array, a first duct defining a first channel and having first and second reflectors at each respective end, a second duct defining a second channel and having first and second reflectors at each respective end, and a controller configured to direct the transducer array to transmit forward and backward ultrasound signals through each duct, calculate a time of flight (ToF) of each ultrasound signal, calculate a velocity of the fluid in a first dimension using the ToF for the ultrasound signals through the first duct, and calculate a velocity of the fluid in a second dimension using the ToF for the ultrasound signals through the second duct.

20 Claims, 10 Drawing Sheets

FLOW METER AND ASSOCIATED METHOD

FIELD OF THE INVENTION

Example embodiments of the present disclosure relate generally to flow meters and, more particularly, to flow meters for determining fluid velocity in two or three dimensions.

BACKGROUND

A flow meter measures velocity and direction of a flow of a fluid, such as a liquid or air. Flow meters specifically for measuring wind are commonly called anemometers. There are several different types of anemometers, including ultrasonic anemometers. Ultrasound anemometers are usually very reliable (no moving parts), but typically expensive and bulky as they require a transducer pair for each dimension (1-D, 2-D, 3-D).

Applicant has identified many technical challenges and difficulties associated with the use of such ultrasound flow meters and anemometers. Through applied effort, ingenuity, and innovation, Applicant has solved problems related to the use of such ultrasound flow meters and anemometers by developing solutions embodied in the present disclosure, which are described in detail below.

BRIEF SUMMARY

Various embodiments described herein related to flow meters and methods for determining a velocity of a fluid.

In accordance with various embodiments of the present disclosure, a flow meter for determining a velocity of a fluid is provided. In some embodiments, the flow meter comprises a single-die steerable transducer array, a first duct defining a first channel and having a first reflector at a first end and a second reflector at a second end, a second duct defining a second channel and having a first reflector at a first end and a second reflector at a second end, and a controller. The controller is configured to direct the transducer array to (1) transmit a first ultrasound signal toward the first reflector of the first duct such that the first ultrasound signal is reflected by the first reflector of the first duct, travels through the first channel toward the second reflector of the first duct, is reflected by the second reflector of the first duct toward the transducer array, and is received by the transducer array, (2) transmit a second ultrasound signal toward the second reflector of the first duct such that the second ultrasound signal is reflected by the second reflector of the first duct, travels through the first channel toward the first reflector of the first duct, is reflected by the first reflector of the first duct toward the transducer array, and is received by the transducer array, (3) transmit a third ultrasound signal toward the first reflector of the second duct such that the third ultrasound signal is reflected by the first reflector of the second duct, travels through the second channel toward the second reflector of the second duct, is reflected by the second reflector of the second duct toward the transducer array, and is received by the transducer array, and (4) transmit a fourth ultrasound signal toward the second reflector of the second duct such that the fourth ultrasound signal is reflected by the second reflector of the second duct, travels through the second channel toward the first reflector of the second duct, is reflected by the first reflector of the second duct toward the transducer array, and is received by the transducer array. The controller is further configured to calculate a time of flight (ToF) of the first ultrasound signal, a time of flight (ToF) of the second ultrasound signal, a time of flight (ToF) of the third ultrasound signal, and a time of flight (ToF) of the fourth ultrasound signal. The controller is further configured to calculate a velocity of the fluid in a first dimension using the ToF of the first ultrasound signal and the ToF of the second ultrasound signal. The controller is further configured to calculate a velocity of the fluid in a second dimension using the ToF of the third ultrasound signal and the ToF of the fourth ultrasound signal.

In some embodiments, the first duct and the second duct are positioned at 90 degrees to each other.

In some embodiments, the first duct and the second duct intersect along a length of one or both of the first duct and the second duct or intersect at corresponding ends of each of the first duct and the second duct.

In some embodiments, the flow meter further comprises a third duct defining a third channel and having a first reflector at a first end and a second reflector at a second end. The controller is further configured to direct the transducer array to (1) transmit a fifth ultrasound signal toward the first reflector of the third duct such that the fifth ultrasound signal is reflected by the first reflector of the third duct, travels through the third channel toward the second reflector of the third duct, is reflected by the second reflector of the third duct toward the transducer array, and is received by the transducer array, and (2) transmit a sixth ultrasound signal toward the second reflector of the third duct such that the sixth ultrasound signal is reflected by the second reflector of the third duct, travels through the third channel toward the first reflector of the third duct, is reflected by the first reflector of the third duct toward the transducer array, and is received by the transducer array. The controller is further configured to calculate a time of flight (ToF) of the fifth ultrasound signal and a time of flight (ToF) of the sixth ultrasound signal. The controller is further configured to calculate a velocity of the fluid in a third dimension using the ToF of the fifth ultrasound signal and the ToF of the sixth ultrasound signal.

In some embodiments, the first duct, the second duct, and the third duct are positioned substantially orthogonal to each other in three-dimensional space.

In some embodiments, the first duct, the second duct, and the third duct intersect at corresponding ends of each of the first duct, the second duct, and the third duct.

In some embodiments, the first duct, the second duct, and the third duct all have a different length.

In some embodiments, the controller is further configured to combine the calculated velocity of the fluid in the first dimension, the calculated velocity of the fluid in the second dimension, and the calculated velocity of the fluid in the third dimension to determine a three-dimensional velocity vector of the fluid.

In some embodiments, the controller calculates the velocity of the fluid in the first dimension, the velocity of the fluid in the second dimension, and the velocity of the fluid in the third dimension using the equation:

$$v = \frac{d_f}{2\cos(\alpha)} \cdot \left(\frac{1}{T_F - t_n} - \frac{1}{T_B - t_n}\right);$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, α is an angle between a direction of a corresponding one of the first ultrasound signal, the third ultrasound signal, or the fifth ultrasound signal and a direction of, a corresponding one of the first duct, the second duct, or the third duct, $T_F$ is a corresponding one of the ToF of the first ultrasound signal, the ToF of the third ultrasound signal, or the ToF of the fifth ultrasound signal, $T_B$ is a corresponding one of the ToF of the second ultrasound signal, the ToF of the fourth ultrasound signal, or the ToF of the sixth ultrasound signal, and $t_n$ is a travel time of a corresponding one of the first ultrasound signal, the third ultrasound signal, or the fifth ultrasound signal within a corresponding one of the first duct, the second duct, or the third duct.

In some embodiments, the controller calculates the velocity of the fluid in the first dimension, the velocity of the fluid in the second dimension, and the velocity of the fluid in the third dimension using the equation:

$$v = \frac{c^2(T_B - T_F)}{2d_f \cdot \cos(\alpha)};$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, a is an angle between a direction of a corresponding one of the first ultrasound signal, the third ultrasound signal, or the fifth ultrasound signal and a direction of a corresponding one of the first duct, the second duct, or the third duct, $T_F$ is a corresponding one of the ToF of the first ultrasound signal, the ToF of the third ultrasound signal of the ToF of the fifth ultrasound signal, $T_B$ is a corresponding one of the ToF of the second ultrasound signal, the ToF of the fourth ultrasound signal, of the ToF of the sixth ultrasound signal, and c is a speed of sound.

In accordance with various embodiments of the present disclosure, a method of determining a velocity of a fluid is provided. In some embodiments, the method comprises transmitting, by single-die steerable transducer array, a first ultrasound signal toward a first reflector of a first duct defining a first channel such that the first ultrasound signal is reflected by the first reflector of the first duct, travels through the first channel toward a second reflector of the first duct, is reflected by the second reflector of the first duct toward the transducer array, and is received by the transducer array; transmitting, by the transducer array, a second ultrasound signal toward the second reflector of the first duct such that the second ultrasound signal is reflected by the second reflector of the first duct, travels through the first channel toward the first reflector of the first duct, is reflected by the first reflector of the first duct toward the transducer array, and is received by the transducer array; transmitting, by the transducer array, a third ultrasound signal toward a first reflector of a second duct defining a second channel such that the third ultrasound signal is reflected by the first reflector of the second duct, travels through the second channel toward a second reflector of the second duct, is reflected by the second reflector of the second duct toward the transducer array, and is received by the transducer array; transmitting, by the transducer array, a fourth ultrasound signal toward the second reflector of the second duct such that the fourth ultrasound signal is reflected by the second reflector of the second duct, travels through the second channel toward the first reflector of the second duct, is reflected by the first reflector of the second duct toward the transducer array, and is received by the transducer array; calculating, by a controller, a time of flight (ToF) of the first ultrasound signal, a time of flight (ToF) of the second ultrasound signal, a time of flight (ToF) of the third ultrasound signal, and a time of flight (ToF) of the fourth ultrasound signal; calculating, by the controller, a velocity of the fluid in a first dimension using the ToF of the first ultrasound signal and the ToF of the second ultrasound signal; and calculating, by the controller, a velocity of the fluid in a second dimension using the ToF of the third ultrasound signal and the ToF of the fourth ultrasound signal.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
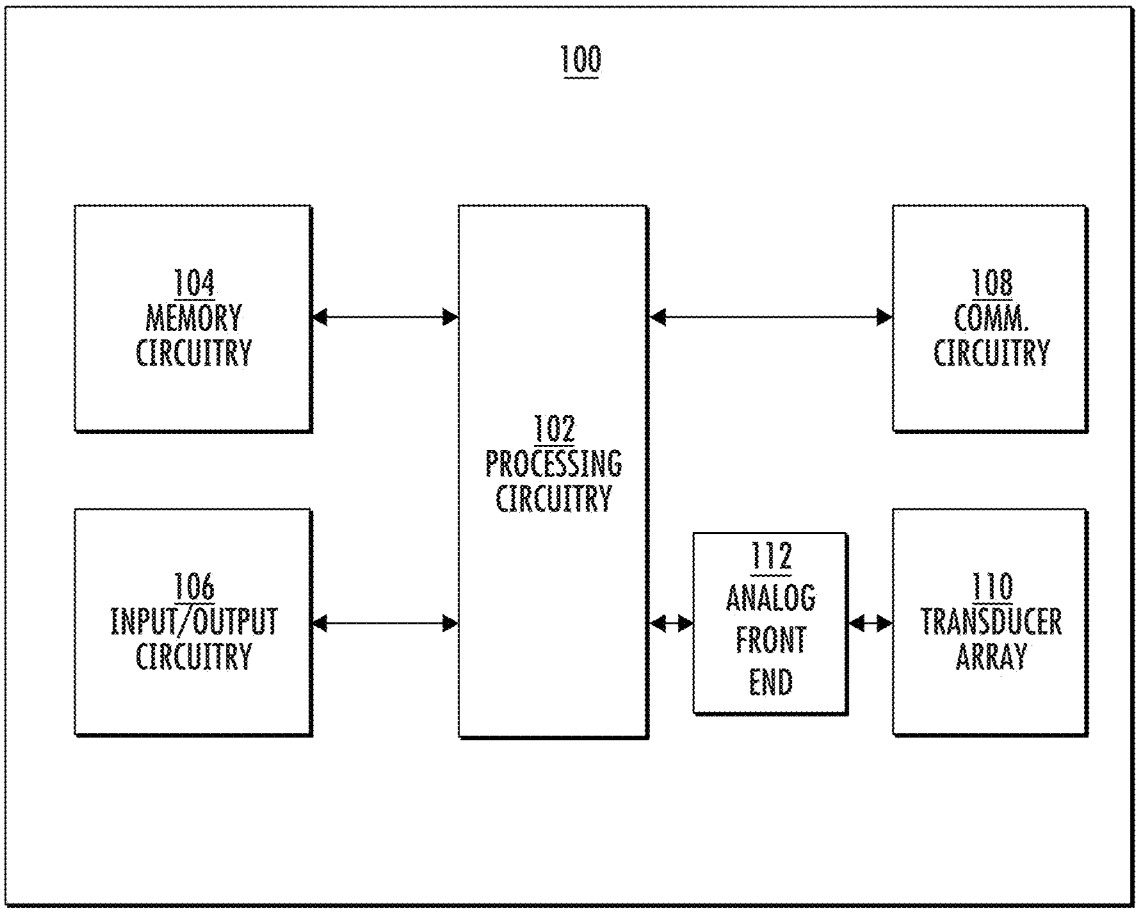
FIG. 1 provides a block diagram of an example control system of an example flow meter, in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various embodiments of the present disclosure overcome the above technical challenges and difficulties and provide various technical improvements and advantages based on, for example, but not limited to, providing example flow meters in which an ultrasonic transducer array directs an ultrasound signal into one or more ducts that are adjacent to a flow of fluid, first in one direction and then in an opposite direction, such that the ultrasound signal bounces off a reflector at one end of the duct, travels down the duct, bounces of a reflector at an opposite end of the duct, and then returns to the transducer array. In various embodiments, for each of the one or more ducts, a velocity of the fluid in a corresponding dimension is calculated based on a time-of-flight (ToF) of the two ultrasound signals directed through each corresponding duct. In various embodiments, the single-die steerable ultrasonic transducer array comprises an array of piezoelectric micromachined ultrasonic transducers (PMUT).

In various embodiments, the ultrasonic transducer array comprises a single die transducer array. That is, all of the transducers are implemented together on a single die. In various embodiments, the transducer array comprises a steerable transducer array. Such a steerable transducer array may comprise the following functionality options: (1) steerable transmission (TX) and omnidirectional reception (RX) (which may be the easiest version to implement), (2) omnidirectional TX and beamforming (i.e., steerable) (on N-channels) RX (which would sense only the signal that comes from a specific direction), or (3) steerable TX and beamforming RX (which may be the most complex in terms of electronics and power consumption, but should have a better immunity to noise).

In various embodiments, the use of a single-die steerable ultrasonic transducer array to transmit and receive the two ultrasound signals directed through each corresponding duct provides for a simpler and less expensive flow meter, especially for a two-dimensional (2-D) or three-dimensional (3-D) flow meter.

FIG. 1 illustrates an exemplary block diagram of an example control system of an example flow meter for measuring a velocity of a fluid, in accordance with an example embodiment of the present disclosure. Specifically, FIG. 1 depicts an example control system of an example flow meter 100 specially configured in accordance with at least some example embodiments of the present disclosure. The flow meter 100 of FIG. 1 comprises processing circuitry 102, memory circuitry 104, input/output circuitry 106, communications circuitry 108, a transducer array 110, and an analog front end 112. In various embodiments, the flow meter 100 is configured to execute and perform the operations described herein. For example, the flow meter 100 may be configured to implement a method for determining a velocity of a fluid in two or more dimensions as described below in relation to FIG. 10.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

Processing circuitry 102 may be embodied in a number of different ways. In various embodiments, the use of the terms "processor," "processing circuitry," "controller," or "control circuitry" should be understood to include a single core processor, a multi-core processor, multiple processors internal to the flow meter 100, and/or one or more remote or "cloud" processor(s) external to the flow meter 100. In some example embodiments, processing circuitry 102 may include one or more processing devices configured to perform independently. Alternatively, or additionally, processing circuitry 102 may include one or more processor(s) configured in tandem via a bus to enable independent execution of operations, instructions, pipelining, and/or multithreading.

In an example embodiment, the processing circuitry 102 may be configured to execute instructions stored in the memory circuitry 104 or otherwise accessible to the processor. Alternatively, or additionally, the processing circuitry 102 may be configured to execute hard-coded functionality. As such, whether configured by hardware or software methods, or by a combination thereof, processing circuitry 102 may represent an entity (e.g., physically embodied in circuitry) capable of performing operations according to embodiments of the present disclosure while configured accordingly. Alternatively, or additionally, processing circuitry 102 may be embodied as an executor of software instructions, and the instructions may specifically configure the processing circuitry 102 to perform the various algorithms embodied in one or more operations described herein when such instructions are executed. In some embodiments, the processing circuitry 102 includes hardware, software, firmware, and/or a combination thereof that performs one or more operations described herein.

In some embodiments, the processing circuitry 102 (and/or co-processor or any other processing circuitry assisting or otherwise associated with the processor) is/are in communication with the memory circuitry 104 via a bus for passing information among components of the flow meter 100.

Memory or memory circuitry 104 may be non-transitory and may include, for example, one or more volatile and/or non-volatile memories. In some embodiments, the memory circuitry 104 includes or embodies an electronic storage device (e.g., a computer readable storage medium). In some embodiments, the memory circuitry 104 is configured to store information, data, content, applications, instructions, or the like, for enabling a flow meter 100 to carry out various operations and/or functions in accordance with example embodiments of the present disclosure.

Input/output circuitry 106 may be included in the flow meter 100. In some embodiments, input/output circuitry 106 may provide output to the user and/or receive input from a user. The input/output circuitry 106 may be in communication with the processing circuitry 102 to provide such functionality. The input/output circuitry 106 may comprise one or more user interface(s). In some embodiments, a user interface may include a display that comprises the interface(s) rendered as a web user interface, an application user interface, a user device, a backend system, or the like. In some embodiments, the input/output circuitry 106 also includes a keyboard, a mouse, a joystick, a touch screen, touch areas, soft keys a microphone, a speaker, or other input/output mechanisms. The processing circuitry 102 and/or input/output circuitry 106 may be configured to control one or more operations and/or functions of one or more user interface elements through computer program instructions (e.g., software and/or firmware) stored on a memory accessible to the processor (e.g., memory circuitry 104, and/or the like). In some embodiments, the input/output circuitry 106 includes or utilizes a user-facing application to provide input/output functionality to a computing device and/or other display associated with a user.

Communications circuitry 108 may be included in the flow meter 100. The communications circuitry 108 may include any means such as a device or circuitry embodied in either hardware or a combination of hardware and software that is configured to receive and/or transmit data from/to a network and/or any other device, circuitry, or module in communication with the flow meter 100. In some embodiments the communications circuitry 108 includes, for example, a network interface for enabling communications with a wired or wireless communications network. Additionally or alternatively, the communications circuitry 108 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 108 may include circuitry for interacting with an antenna(s) and/or other hardware or software to cause transmission of signals via the antenna(s) and/or to handle receipt of signals received via the antenna(s). In some embodiments, the communications circuitry 108 enables transmission to and/or receipt of data from a user device, one or more sensors, and/or other external computing device(s) in communication with the flow meter 100.

In some embodiments, two or more of the sets of circuitry 102-108 are combinable. Alternatively, or additionally, one or more of the sets of circuitry 102-108 perform some or all of the operations and/or functionality described herein as being associated with another circuitry. In some embodiments, two or more of the sets of circuitry 102-108 are combined into a single module embodied in hardware, software, firmware, and/or a combination thereof.

In an example embodiment, the processing circuitry 102 communicates with the transducer array 110 via an analog front end 112 or other similar circuitry which provides the specific circuitry required to drive and sense the transducer array 110. In an example embodiment, the processing circuitry 102 provides a control signal to the transducer array 110 to direct the transducer array 110 to transmit ultrasound signals as described herein and to, in conjunction with the transducer array 110, determine the ToF of each ultrasound signal.

Figure 2A:
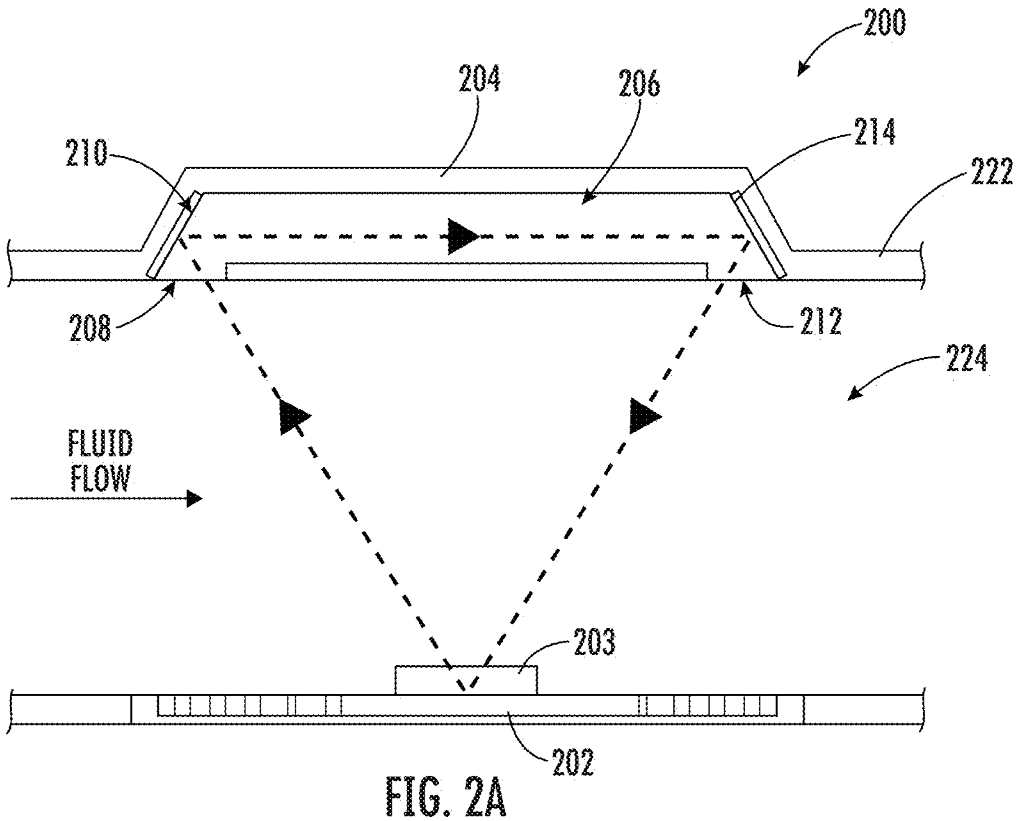
FIGS. 2A and 2B are sectional views of an example flow meter, in accordance with some embodiments of the present disclosure.
Figure 2B:
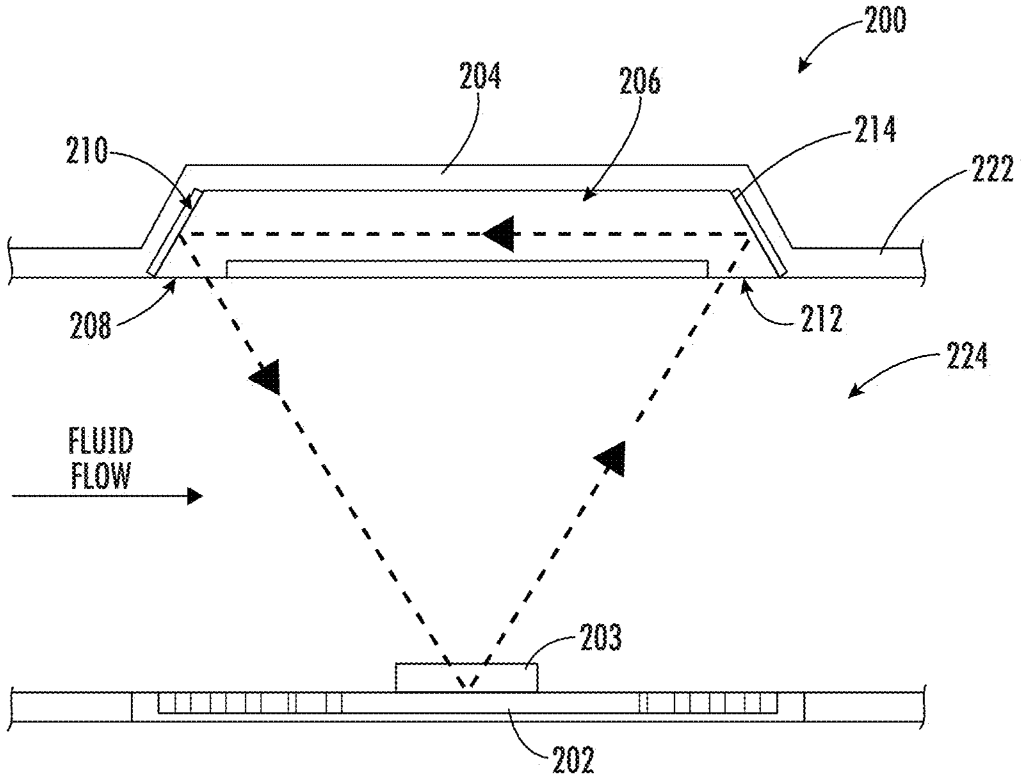

Reference will now be made to FIGS. 2A and 2B which provide sectional views of an example flow meter, in accordance with some embodiments of the present disclosure. FIGS. 2A and 2B illustrate the foundational principles of various embodiments of the invention in a one-dimensional (1-D) flow meter. In various embodiments, these foundational principles are extended to 2-D and 3-D flow meters.

FIGS. 2A and 2B each illustrate a 1-D flow meter (or a single duct of a 2-D or 3-D flow meter) in accordance with various embodiments of the present disclosure. The flow meter 200 of FIGS. 2A and 2B comprises a structure 222 defining a space 224 through which a fluid flows (indicated by the arrow). In some embodiments, the structure 222 comprises a pipe and the fluid comprises a liquid. In some other embodiments, the structure 222 comprises an open framework, the fluid comprises air, and the flow meter 200 comprises an anemometer. The flow meter 200 of FIGS. 2A and 2B further comprises a transducer array 203 (shown mounted on a printed circuit board 202) on one side of the structure 222 and a duct 204 on an opposite side of the structure 222. In some embodiments, the transducer array 203 comprises a single-die steerable ultrasonic transducer array. In some embodiments, the transducer array 203 comprises an array of piezoelectric micromachined ultrasonic transducers (PMUT). For example, the transducer array 203 may comprise a 5×5 array of PMUTs. In another example for a 1-D flow meter, the transducer array 203 may comprise a plurality of PMUTs arranged linearly.

In various embodiments, a 2-D flow meter would have two such ducts (typically arranged at about 90 degrees to each other) and a 3-D flow meter would have three such ducts (typically arranged substantially orthogonally in the 3-D space). In various embodiments, the duct 204 (or ducts for a 2-D or 3-D flow meter) are positioned adjacent to the fluid flow such that little or none of the fluid enters the duct(s).

In various embodiments, the duct 204 defines a channel 206 within the duct, with a first opening 208 at one end and a second opening 212 at a second, opposite end. In various embodiments, a first reflector 210 is positioned adjacent the first opening 208 and a second reflector 214 is positioned adjacent the second opening 212. For example, the first reflector 210 and the second reflector each comprise a mirror. However, in various other embodiments, the reflectors do not need to be separated components applied to the structure of the duct or the flow meter. Rather, the corresponding end surfaces of the duct may act as reflectors as long as the surfaces are smooth enough to obtain specular reflection (rather than diffused reflection) of the ultrasound waves at the working frequency. In various embodiments the first reflector 210 and the second reflector are positioned and angled to reflect ultrasound signals from the transducer array 203 and back to the transducer array 203 as described below.

As seen in FIG. 2A, the transducer array 203 transmits an ultrasound signal (indicated by the dashed line) toward the first reflector 210 such that the ultrasound signal enters the duct 204 through the first opening 208 and is reflected by the first reflector 210, travels through the channel 206 toward the second reflector 214, is reflected by the second reflector 214 toward the transducer array 203, and is received by the transducer array 203. In various embodiments, the ultrasound signal illustrated in FIG. 2A may be termed a first ultrasound signal or a forward ultrasound signal. In various embodiments, a controller in communication with the transducer array 203 determines a ToF of this forward ultrasound signal.

In various embodiments, the cross-sectional dimension of the duct (e.g., the diameter for a cylindrical duct) and the dimension of the first and second openings to the duct should be much greater than the wavelength of the ultrasound signal.

As seen in FIG. 2B, the transducer array 203 transmits an ultrasound signal (indicated by the dashed line) toward the second reflector 214 such that the ultrasound signal enters the duct 204 through the second opening 212 and is reflected by the second reflector 214, travels through the channel 206 toward the first reflector 210, is reflected by the first reflector 210 toward the transducer array 203, and is received by the transducer array 203. In various embodiments, the ultrasound signal illustrated in FIG. 2B may be termed a second ultrasound signal or a backward ultrasound signal. In various embodiments, a controller in communication with the transducer array 203 determines a ToF of this backward ultrasound signal.

In various embodiments, the steerable ultrasonic transducer array 203 enables the transmission and reception of the forward and backward ultrasound signals from a single component, thereby providing a flow meter with decreased cost, size, and complexity.

In various embodiments, a controller in communication with the transducer array 203 calculates a velocity of the fluid using the ToF of the forward ultrasound signal and the ToF of the backward ultrasound signal.

In the illustrated embodiment, the transducer array and the duct are in what may be termed a symmetrical arrangement in that the transducer array 203 is positioned across from the midpoint of the duct 204 such that the distance between the transducer array 203 and the first reflector 210 is the same as the distance between the transducer array 203 and the second reflector 214 and such that the angle of the ultrasound signal between the transducer array 203 and the first reflector 210 is the same as the angle between the transducer array 203 and the second reflector 214. In some other embodiments, the transducer array and the duct may be in what may be termed an asymmetrical arrangement in which the transducer array 203 is positioned closer to one end or the other of the duct 204 such that the distance between the transducer array 203 and the first reflector 210 is not the same as the distance between the transducer array 203 and the second reflector 214 and such that the angle of the ultrasound signal between the transducer array 203 and the first reflector 210 is not the same as the angle between the transducer array 203 and the second reflector 214.

Figure 3:
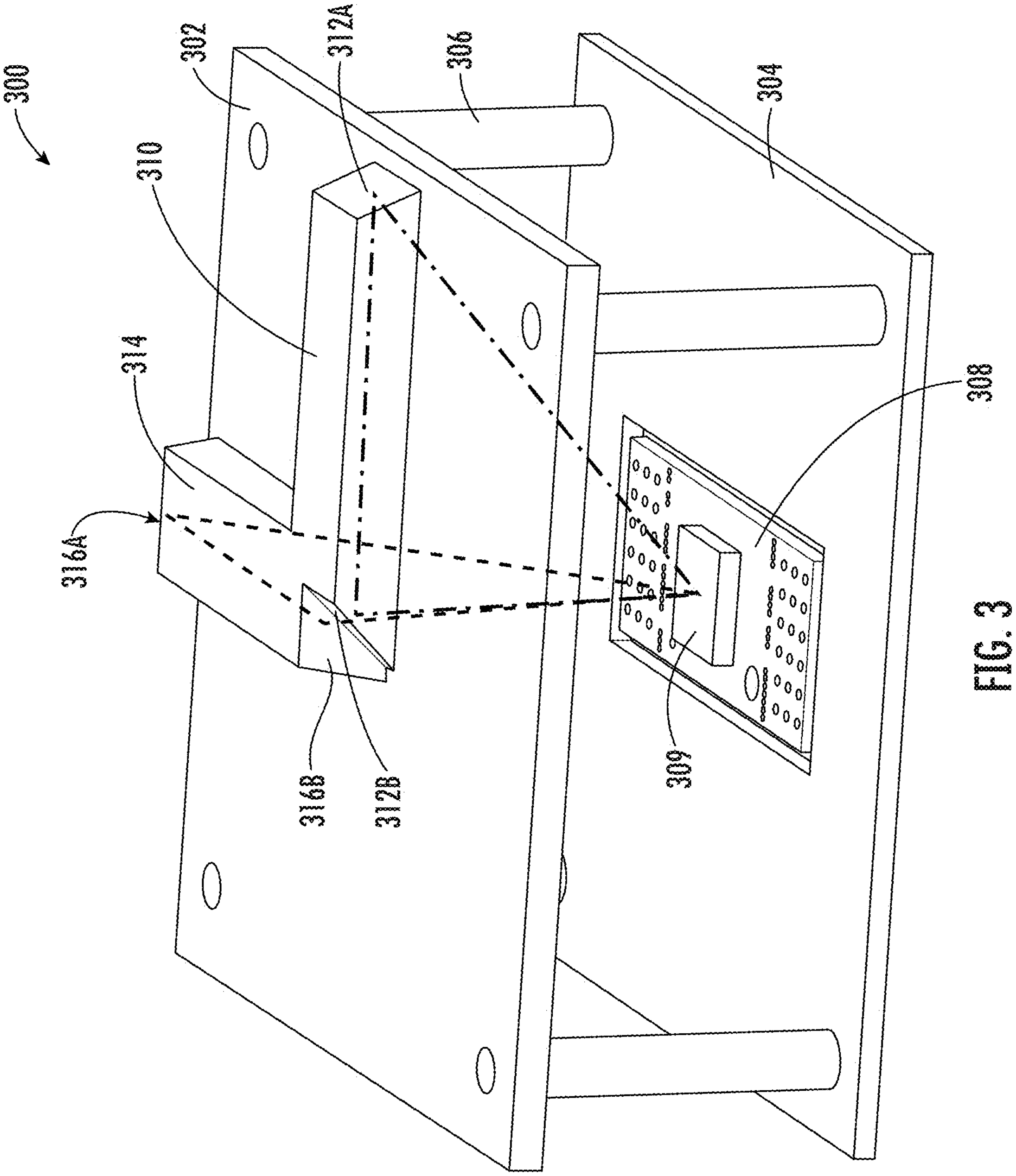
FIG. 3 is a perspective view of an example flow meter, in accordance with some embodiments of the present disclosure.
Figure 4:
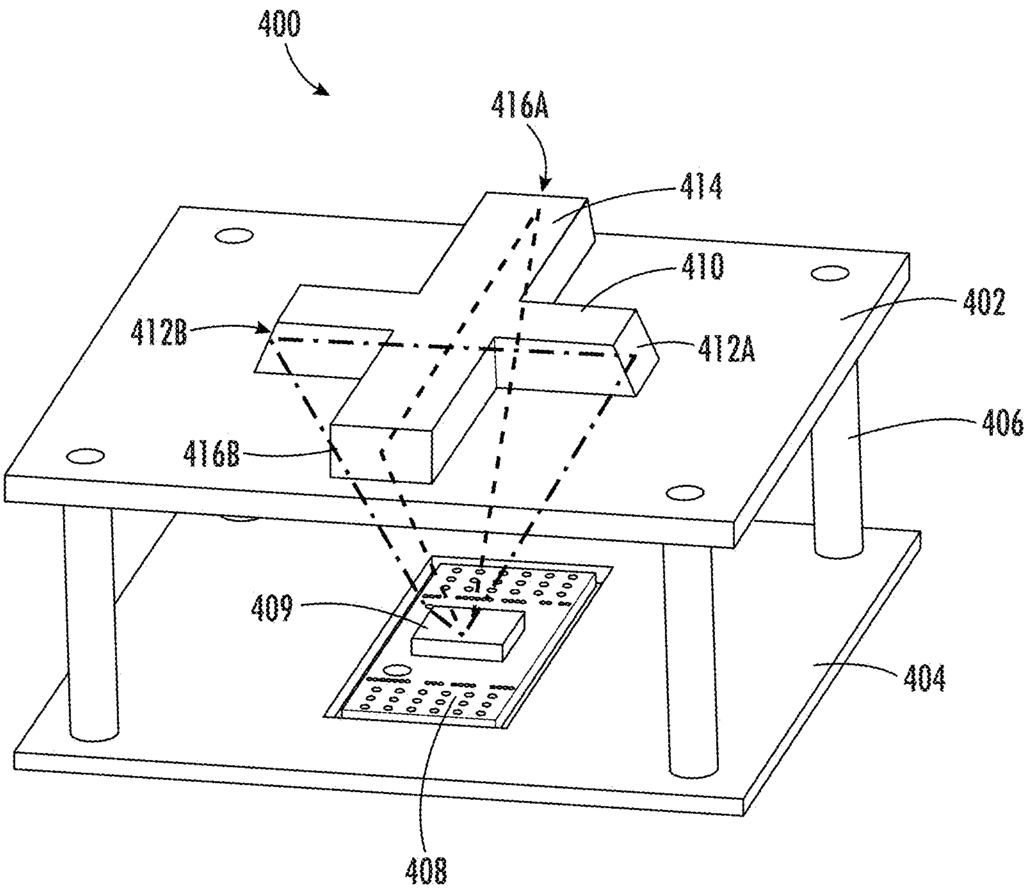
FIG. 4 is a perspective view of an example flow meter, in accordance with some embodiments of the present disclosure.
Figure 5:
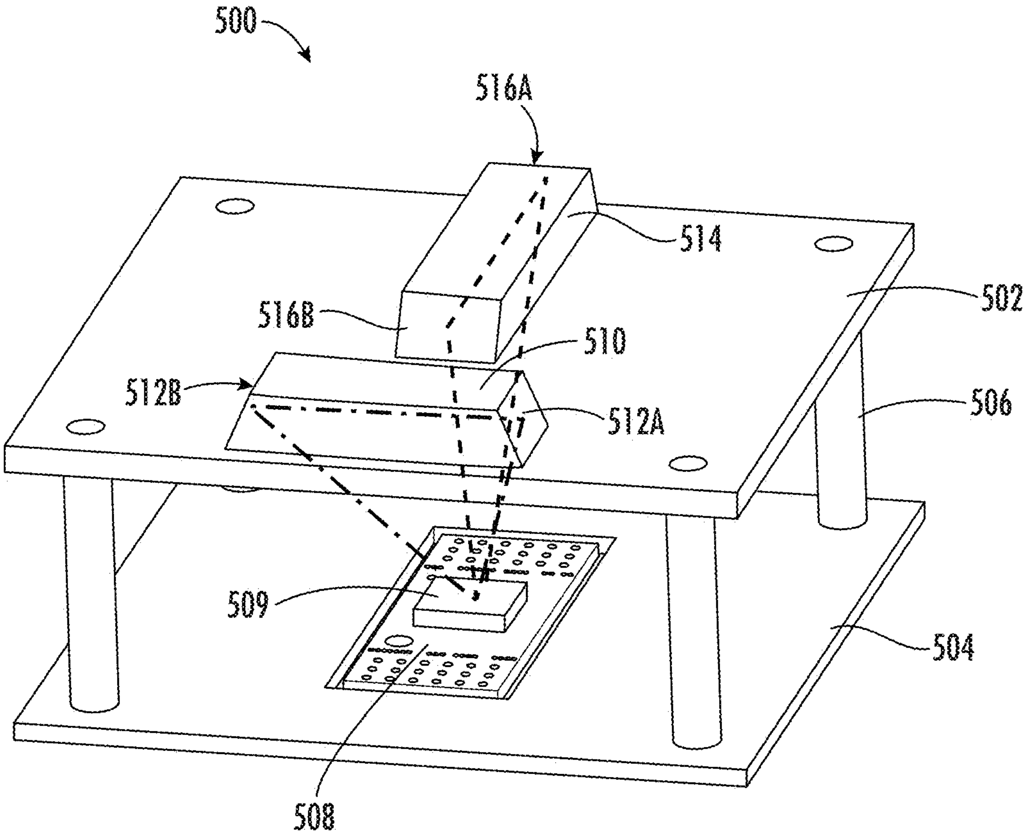
FIG. 5 is a perspective view of an example flow meter, in accordance with some embodiments of the present disclosure.

Reference will now be made to FIGS. 3-5 which provide perspective views of example 2-D flow meters, in accordance with some embodiments of the present disclosure. The flow meter 300 of FIG. 3 comprises a structure comprising an upper plate 302, a lower plate 304, and a plurality of supports 306 therebetween to define a space through which a fluid (typically air) can flow such that the velocity of the fluid can be measured in two dimensions. A transducer array 309 (shown mounted on a printed circuit board 308) is positioned on the lower plate 304. A first duct 310 and a second duct 314 are positioned on the upper plate 302. The first duct 310 and the second duct 314 are positioned at about 90 degrees to each other. In various embodiments, the first duct 310 and the second duct 314 have different lengths to prevent multiple simultaneous propagation paths of ultrasound signals. As with the duct 204 of FIGS. 2A and 2B, the first duct 310 and the second duct 314 each define a channel (not illustrated) and each have a first opening (not illustrated), a first reflector (not illustrated) adjacent the first opening, a second opening (not illustrated), and a second reflector (not illustrated) adjacent the second opening. In the illustrated embodiment, the first duct 310 and the second duct 314 intersect at their respective second ends such that the second opening of the first duct 310 and the second opening of the second duct 314 may be defined as a single opening. The first reflector of the first duct 310 is positioned on the inside of the first end wall 312A and the second reflector of the first duct 310 is positioned on the inside of the second end wall 312B. The first reflector of the second duct 314 is positioned on the inside of the first end wall 316A and the second reflector of the second duct 314 is positioned on the inside of the second end wall 316B.

In operation in various embodiments, the transducer array 309 transmits forward and backward ultrasound signals (indicated by the dot-dash line) through the first duct 310 (similar to what is described in relation to FIGS. 2A and 2B above) and a controller in communication with the transducer array 309 determines a ToF of each of the forward and backward ultrasound signals and calculates a velocity of the fluid in a first dimension using the ToF of the forward ultrasound signal and the ToF of the backward ultrasound signal through the first duct 310. Similarly, the transducer array 309 transmits forward and backward ultrasound signals (indicated by the dashed line) through the second duct 314 (similar to what is described in relation to FIGS. 2A and 2B above) and a controller in communication with the transducer array 309 determines a ToF of each of the forward and backward ultrasound signals and calculates a velocity of the fluid in a second dimension using the ToF of the forward ultrasound signal and the ToF of the backward ultrasound signal through the second duct 314.

In various embodiments, a controller in communication with the transducer array of a 2-D flow meter is configured to combine the calculated velocity of the fluid in the first dimension and the calculated velocity of the fluid in the second dimension to determine a two-dimensional velocity vector of the fluid.

In various embodiments, the steerable ultrasonic transducer array 309 enables the transmission and reception of the forward and backward ultrasound signals in the first and second ducts from a single component, thereby providing a 2-D flow meter with decreased costs, size, and complexity.

The flow meter 400 of FIG. 4 comprises a structure comprising an upper plate 402, a lower plate 404, and a plurality of supports 406 therebetween to define a space through which a fluid (typically air) can flow such that the velocity of the fluid can be measured in two dimensions. A transducer array 409 (shown mounted on a printed circuit board 408) is positioned on the lower plate 404. A first duct 410 and a second duct 414 are positioned on the upper plate 402. The first duct 410 and the second duct 414 are positioned at about 90 degrees to each other. In the illustrated embodiment, the first duct 410 and the second duct 414 intersect at about the midpoint of each duct. As with the duct 204 of FIGS. 2A and 2B, the first duct 410 and the second duct 414 each define a channel (not illustrated) and each have a first opening (not illustrated), a first reflector (not illustrated) adjacent the first opening, a second opening (not illustrated), and a second reflector (not illustrated) adjacent the second opening. The first reflector of the first duct 410 is positioned on the inside of the first end wall 412A and the second reflector of the first duct 410 is positioned on the inside of the second end wall 412B. The first reflector of the second duct 414 is positioned on the inside of the first end wall 416A and the second reflector of the second duct 414 is positioned on the inside of the second end wall 416B.

In operation in various embodiments, the transducer array 409 transmits forward and backward ultrasound signals (indicated by the dot-dash line) through the first duct 410 (similar to what is described in relation to FIGS. 2A and 2B above) and a controller in communication with the transducer array 409 determines a ToF of each of the forward and backward ultrasound signals and calculates a velocity of the fluid in a first dimension using the ToF of the forward ultrasound signal and the ToF of the backward ultrasound signal through the first duct 410. Similarly, the transducer array 409 transmits forward and backward ultrasound signals (indicated by the dashed line) through the second duct 414 (similar to what is described in relation to FIGS. 2A and 2B above) and a controller in communication with the transducer array 409 determines a ToF of each of the forward and backward ultrasound signals and calculates a velocity of the fluid in a second dimension using the ToF of the forward ultrasound signal and the ToF of the backward ultrasound signal through the second duct 414.

In various embodiments, a controller in communication with the transducer array of a 2-D flow meter is configured to combine the calculated velocity of the fluid in the first dimension and the calculated velocity of the fluid in the second dimension to determine a two-dimensional velocity vector of the fluid.

In various embodiments, the steerable ultrasonic transducer array 409 enables the transmission and reception of the forward and backward ultrasound signals in the first and second ducts from a single component, thereby providing a 2-D flow meter with decreased costs, size, and complexity.

The flow meter 500 of FIG. 5 comprises a structure comprising an upper plate 502, a lower plate 504, and a plurality of supports 506 therebetween to define a space through which a fluid (typically air) can flow such that the velocity of the fluid can be measured in two dimensions. A transducer array 509 (shown mounted on a printed circuit board 508) is positioned on the lower plate 504. A first duct 510 and a second duct 514 are positioned on the upper plate 502. The first duct 510 and the second duct 514 are positioned at about 90 degrees to each other. In the illustrated embodiment, the first duct 510 and the second duct 514 do not intersect. As with the duct 204 of FIGS. 2A and 2B, the first duct 510 and the second duct 514 each define a channel (not illustrated) and each have a first opening (not illustrated), a first reflector (not illustrated) adjacent the first opening, a second opening (not illustrated), and a second reflector (not illustrated) adjacent the second opening. The first reflector of the first duct 510 is positioned on the inside of the first end wall 512A and the second reflector of the first duct 510 is positioned on the inside of the second end wall 512B. The first reflector of the second duct 514 is positioned on the inside of the first end wall 516A and the second reflector of the second duct 514 is positioned on the inside of the second end wall 516B.

In operation in various embodiments, the transducer array 509 transmits forward and backward ultrasound signals (indicated by the dot-dash line) through the first duct 510 (similar to what is described in relation to FIGS. 2A and 2B above) and a controller in communication with the transducer array 509 determines a ToF of each of the forward and backward ultrasound signals and calculates a velocity of the fluid in a first dimension using the ToF of the forward ultrasound signal and the ToF of the backward ultrasound signal through the first duct 510. Similarly, the transducer array 509 transmits forward and backward ultrasound signals (indicated by the dashed line) through the second duct 514 (similar to what is described in relation to FIGS. 2A and 2B above) and a controller in communication with the transducer array 509 determines a ToF of each of the forward and backward ultrasound signals and calculates a velocity of the fluid in a second dimension using the ToF of the forward ultrasound signal and the ToF of the backward ultrasound signal through the second duct 514.

In various embodiments, a controller in communication with the transducer array of a 2-D flow meter is configured to combine the calculated velocity of the fluid in the first dimension and the calculated velocity of the fluid in the second dimension to determine a two-dimensional velocity vector of the fluid.

In various embodiments, the steerable ultrasonic transducer array 509 enables the transmission and reception of the forward and backward ultrasound signals in the first and second ducts from a single component, thereby providing a 2-D flow meter with decreased costs, size, and complexity.

Figure 6:
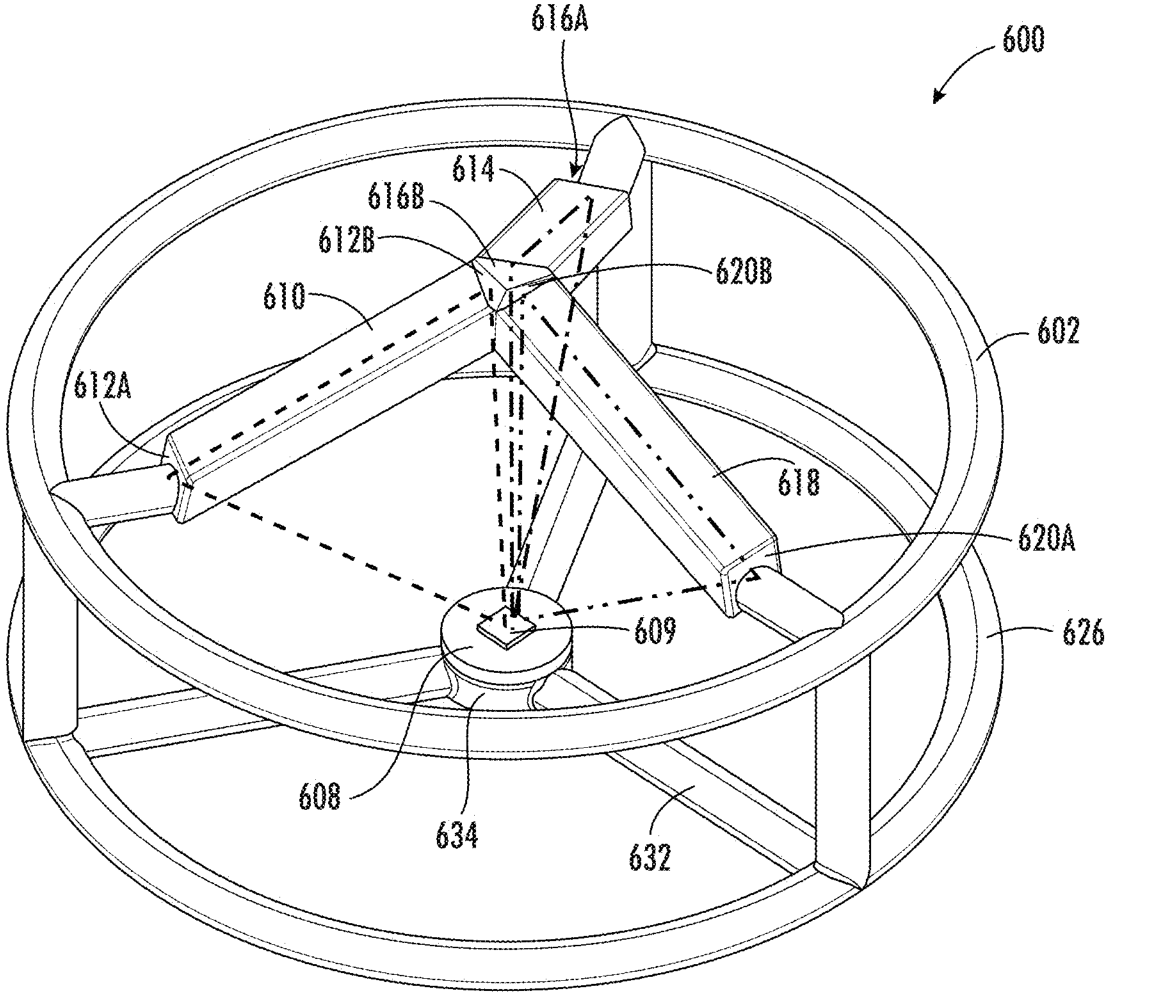
FIG. 6 is a perspective view of an example flow meter, in accordance with some embodiments of the present disclosure.

The flow meter 600 of FIG. 6 comprises a structure 602 comprising an upper ring 624, a lower ring 626, and a plurality of supports 628 therebetween to define a space through which a fluid (typically air) can flow such that the velocity of the fluid can be measured in three dimensions. The structure further comprises upper support arms 630 which each support one end of a corresponding duct (described below) and lower support arms 632 which support a platform 634 upon which a transducer array (described below) is mounted. The structure 602 illustrated in FIG. 6 is one of many alternative structures that may be used in various embodiments of the invention. In various embodiments, any suitable structure may be used that holds the ducts and transducer array in their proper positions as described herein and that presents an acceptably small amount of drag to the fluid flow.

A transducer array 609 (shown mounted on a printed circuit board 608) is positioned on the platform 634. A first duct 610, a second duct 614, and a third duct 618 are supported above the transducer array 609. The upper support arms 630 each support one end of a corresponding one of the first duct 610, the second duct 614, and the third duct 618, while the opposing ends of the first duct 610, the second duct 614, and the third duct 618 support each other. The first duct 610, the second duct 614, and the third duct 618 are positioned at about 90 degrees to each other (i.e., orthogonal to each other in the 3-D space).

In various embodiments, the first duct 610, the second duct 614, and the third duct 618 have different lengths to prevent multiple simultaneous propagation paths of ultrasound signals. As with the duct 204 of FIGS. 2A and 2B, the first duct 610, the second duct 614, and the third duct 618 each define a channel (not illustrated) and each have a first opening (not illustrated), a first reflector (not illustrated) adjacent the first opening, a second opening (not illustrated), and a second reflector (not illustrated) adjacent the second opening.

In the illustrated embodiment, the first duct 610, the second duct 614, and the third duct 618 intersect at their respective second ends such that the second opening of the first duct 610, the second opening of the second duct 614, and the second opening of the third duct 618 may be defined as a single opening.

The first reflector of the first duct 610 is positioned on the inside of the first end wall 612A and the second reflector of the first duct 610 is positioned on the inside of the second end wall 612B. The first reflector of the second duct 614 is positioned on the inside of the first end wall 616A and the second reflector of the second duct 614 is positioned on the inside of the second end wall 616B. The first reflector of the third duct 618 is positioned on the inside of the first end wall 620A and the second reflector of the third duct 618 is positioned on the inside of the second end wall 620B.

In operation in various embodiments, the transducer array 609 transmits forward and backward ultrasound signals (indicated by the dashed line) through the first duct 610 (similar to what is described in relation to FIGS. 2A and 2B above) and a controller in communication with the transducer array 609 determines a ToF of each of the forward and backward ultrasound signals and calculates a velocity of the fluid in a first dimension using the ToF of the forward ultrasound signal and the ToF of the backward ultrasound signal through the first duct 610. Similarly, the transducer array 609 transmits forward and backward ultrasound signals (indicated by the dot-dash line) through the second duct 614 (similar to what is described in relation to FIGS. 2A and 2B above) and a controller in communication with the transducer array 609 determines a ToF of each of the forward and backward ultrasound signals and calculates a velocity of the fluid in a second dimension using the ToF of the forward ultrasound signal and the ToF of the backward ultrasound signal through the second duct 614. Similarly, the transducer array 609 transmits forward and backward ultrasound signals (indicated by the dot-dot-dash line) through the third duct 618 (similar to what is described in relation to FIGS. 2A and 2B above) and a controller in communication with the transducer array 609 determines a ToF of each of the forward and backward ultrasound signals and calculates a velocity of the fluid in a third dimension using the ToF of the forward ultrasound signal and the ToF of the backward ultrasound signal through the third duct 618.

In various embodiments, a controller in communication with the transducer array of a 3-D flow meter is configured to combine the calculated velocity of the fluid in the first dimension, the calculated velocity of the fluid in the second dimension, and the calculated velocity of the fluid in the third dimension to determine a three-dimensional velocity vector of the fluid.

In various embodiments, the steerable ultrasonic transducer array 609 enables the transmission and reception of the forward and backward ultrasound signals in the first, second, and third ducts from a single component, thereby providing a 3-D flow meter with decreased costs, size, and complexity.

Figure 7A:
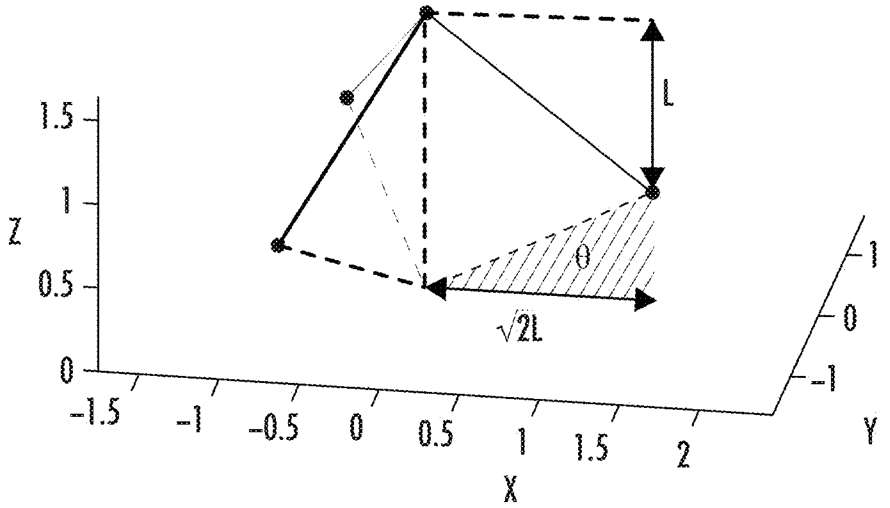
FIGS. 7A and 7B illustrate example layout details of the example flow meter of FIG. 6.
Figure 7B:
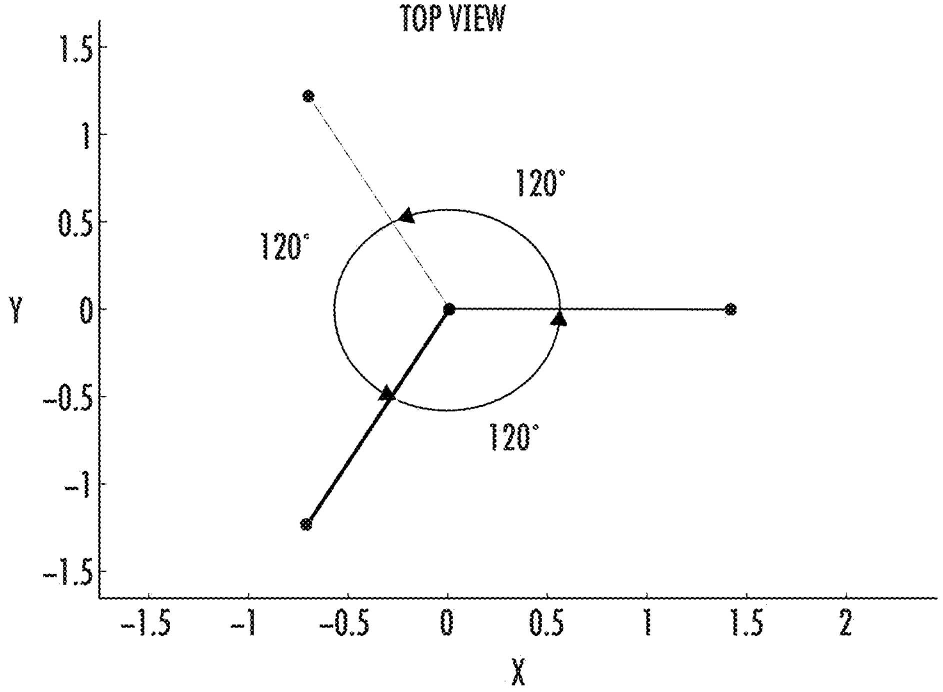

FIGS. 7A and 7B illustrate some properties of the geometries of the flow meter 600 of FIG. 6. As seen in FIG. 7A, the length of each duct along the horizontal plane (the x axis) is equal to the length L of each duct along the vertical plane (the z axis) time the square root of two. As further seen in FIG. 7A, the angle θ of the first opening of each duct above the base horizontal plane is the minimum elevation that is compatible with the beam-steering capability of the transducer array. As seen in FIG. 7B, the three ducts are positioned about 120 degrees apart (as projected onto the horizontal plane).

Figure 8:
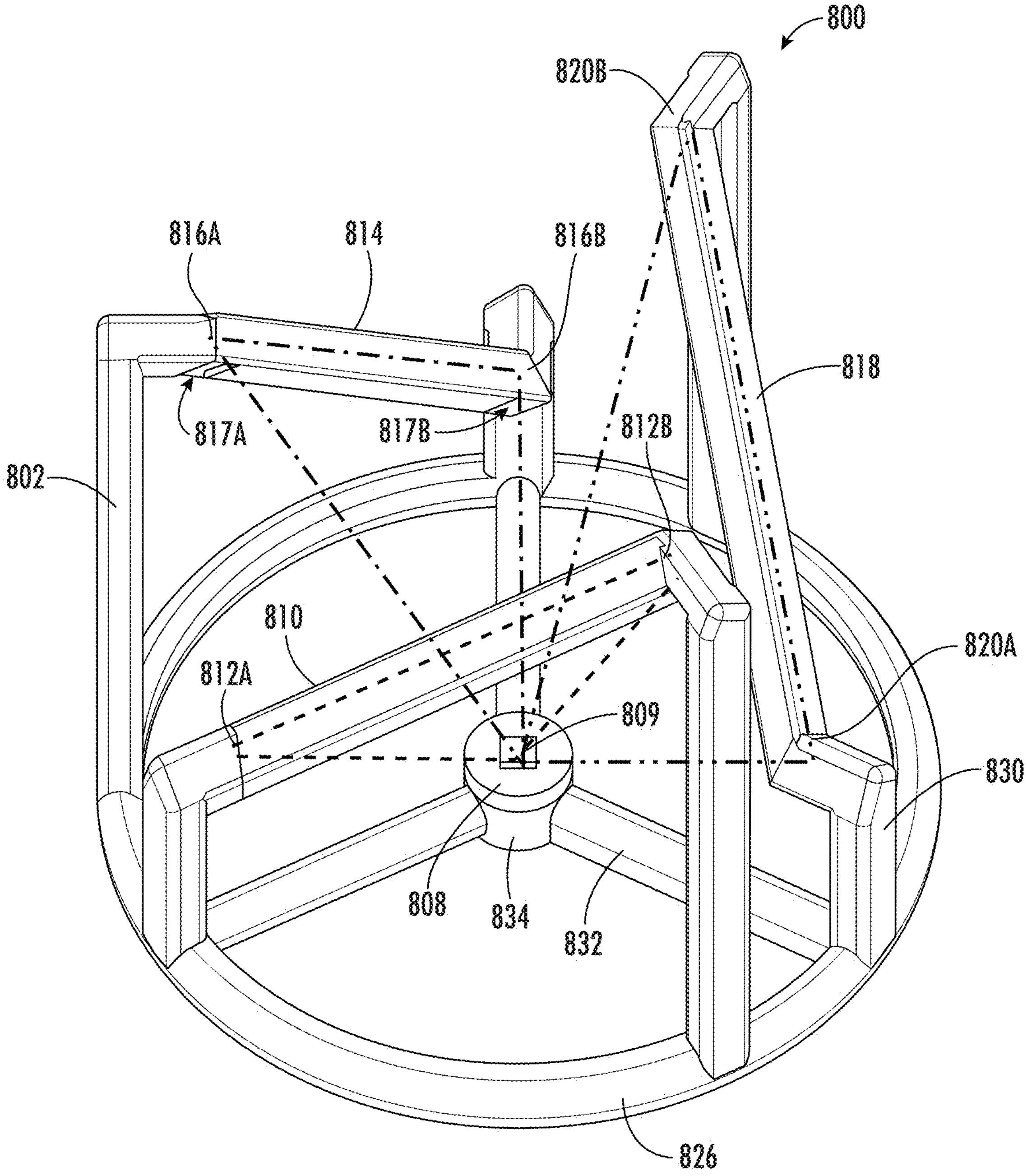
FIG. 8 is a perspective view of an example flow meter, in accordance with some embodiments of the present disclosure.

The flow meter 800 of FIG. 8 comprises a structure 802 comprising a lower ring 826, support arms 830 which each support corresponding ends of a corresponding duct (described below) and lower support arms 832 which support a platform 834 upon which a transducer array (described below) is mounted. The structure 802 defines a space through which a fluid (typically air) can flow such that the velocity of the fluid can be measured in three dimensions. The structure 802 illustrated in FIG. 8 is one of many alternative structures that may be used in various embodiments of the invention. In various embodiments, any suitable structure may be used that holds the ducts and transducer array in their proper positions as described herein and that presents an acceptably small amount of drag to the fluid flow.

A transducer array 809 (shown mounted on a printed circuit board 808) is positioned on the platform 834. A first duct 810, a second duct 814, and a third duct 818 are supported above the transducer array 809. The support arms 830 comprise both vertical and horizontal portions to support and position the ends of the first duct 810, the second duct 814, and the third duct 818. The first duct 810, the second duct 814, and the third duct 818 are positioned at about 90 degrees to each other (i.e., orthogonal to each other in the 3-D space). As with the duct 204 of FIGS. 2A and 2B, the first duct 810, the second duct 814, and the third duct 818 each define a channel (not illustrated) and each have a first opening (only first opening 817A of the first duct 810 is illustrated), a first reflector (not illustrated) adjacent the first opening, a second opening (only second opening 817B of the first duct 810 is illustrated), and a second reflector (not illustrated) adjacent the second opening.

The first reflector of the first duct 810 is positioned on the inside of the first end wall 812A and the second reflector of the first duct 810 is positioned on the inside of the second end wall 812B. The first reflector of the second duct 814 is positioned on the inside of the first end wall 816A and the second reflector of the second duct 814 is positioned on the inside of the second end wall 816B. The first reflector of the third duct 818 is positioned on the inside of the first end wall 820A and the second reflector of the third duct 818 is positioned on the inside of the second end wall 820B.

In operation in various embodiments, the transducer array 809 transmits forward and backward ultrasound signals (indicated by the dashed line) through the first duct 810 (similar to what is described in relation to FIGS. 2A and 2B above) and a controller in communication with the transducer array 809 determines a ToF of each of the forward and backward ultrasound signals and calculates a velocity of the fluid in a first dimension using the ToF of the forward ultrasound signal and the ToF of the backward ultrasound signal through the first duct 810. Similarly, the transducer array 809 transmits forward and backward ultrasound signals (indicated by the dot-dash line) through the second duct 814 (similar to what is described in relation to FIGS. 2A and 2B above) and a controller in communication with the transducer array 809 determines a ToF of each of the forward and backward ultrasound signals and calculates a velocity of the fluid in a second dimension using the ToF of the forward ultrasound signal and the ToF of the backward ultrasound signal through the second duct 814. Similarly, the transducer array 809 transmits forward and backward ultrasound signals (indicated by the dot-dot-dash line) through the third duct 818 (similar to what is described in relation to FIGS. 2A and 2B above) and a controller in communication with the transducer array 809 determines a ToF of each of the forward and backward ultrasound signals and calculates a velocity of the fluid in a third dimension using the ToF of the forward ultrasound signal and the ToF of the backward ultrasound signal through the third duct 818.

In various embodiments, a controller in communication with the transducer array of a 3-D flow meter is configured to combine the calculated velocity of the fluid in the first dimension, the calculated velocity of the fluid in the second dimension, and the calculated velocity of the fluid in the third dimension to determine a three-dimensional velocity vector of the fluid.

In various embodiments, the steerable ultrasonic transducer array 809 enables the transmission and reception of the forward and backward ultrasound signals in the first, second, and third ducts from a single component, thereby providing a 3-D flow meter with decreased costs, size, and complexity.

Figure 9A:
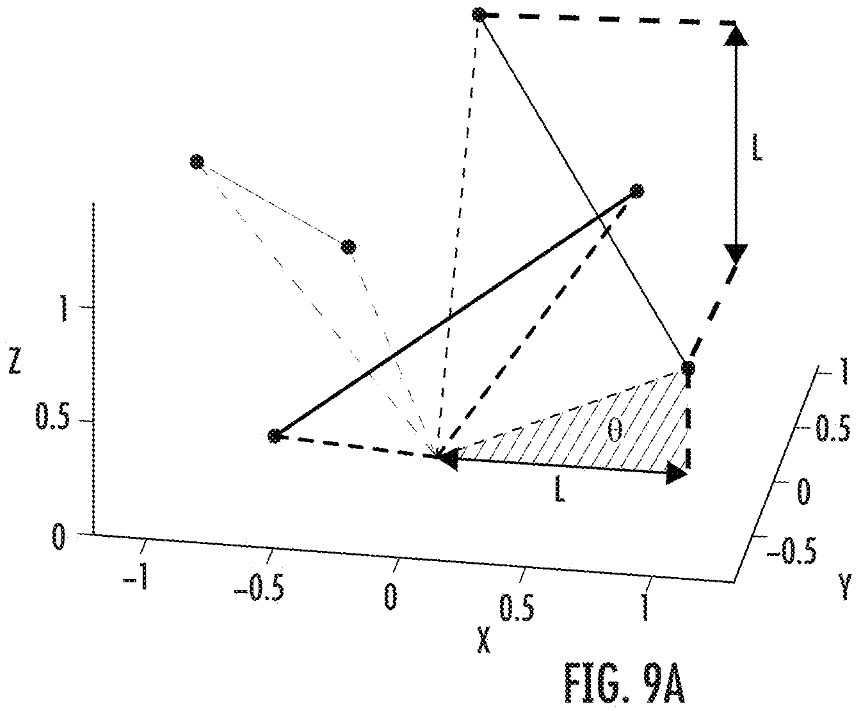
FIGS. 9A and 9B illustrate example layout details of the example flow meter of FIG. 8.
Figure 9B:
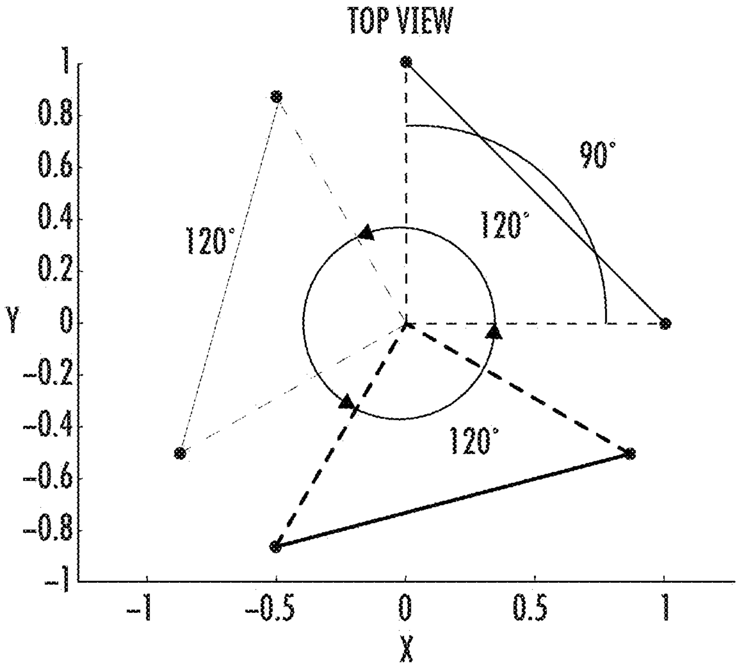

FIGS. 9A and 9B illustrate some properties of the geometries of the flow meter 800 of FIG. 8. As seen in FIG. 9A, the length of each duct along the horizontal plane (the x axis) is equal to the length L of each duct along the vertical plane (the z axis). As further seen in FIG. 9A, the angle θ of the first opening of each duct above the base horizontal plane is the minimum elevation that is compatible with the beam-steering capability of the transducer array. As seen in FIG. 9B, the three ducts are positioned about 120 degrees apart (as projected onto the horizontal plane) and each duct is arranged such that each duct is the hypotenuse of a right triangle formed with the transducer array.

Figure 10:
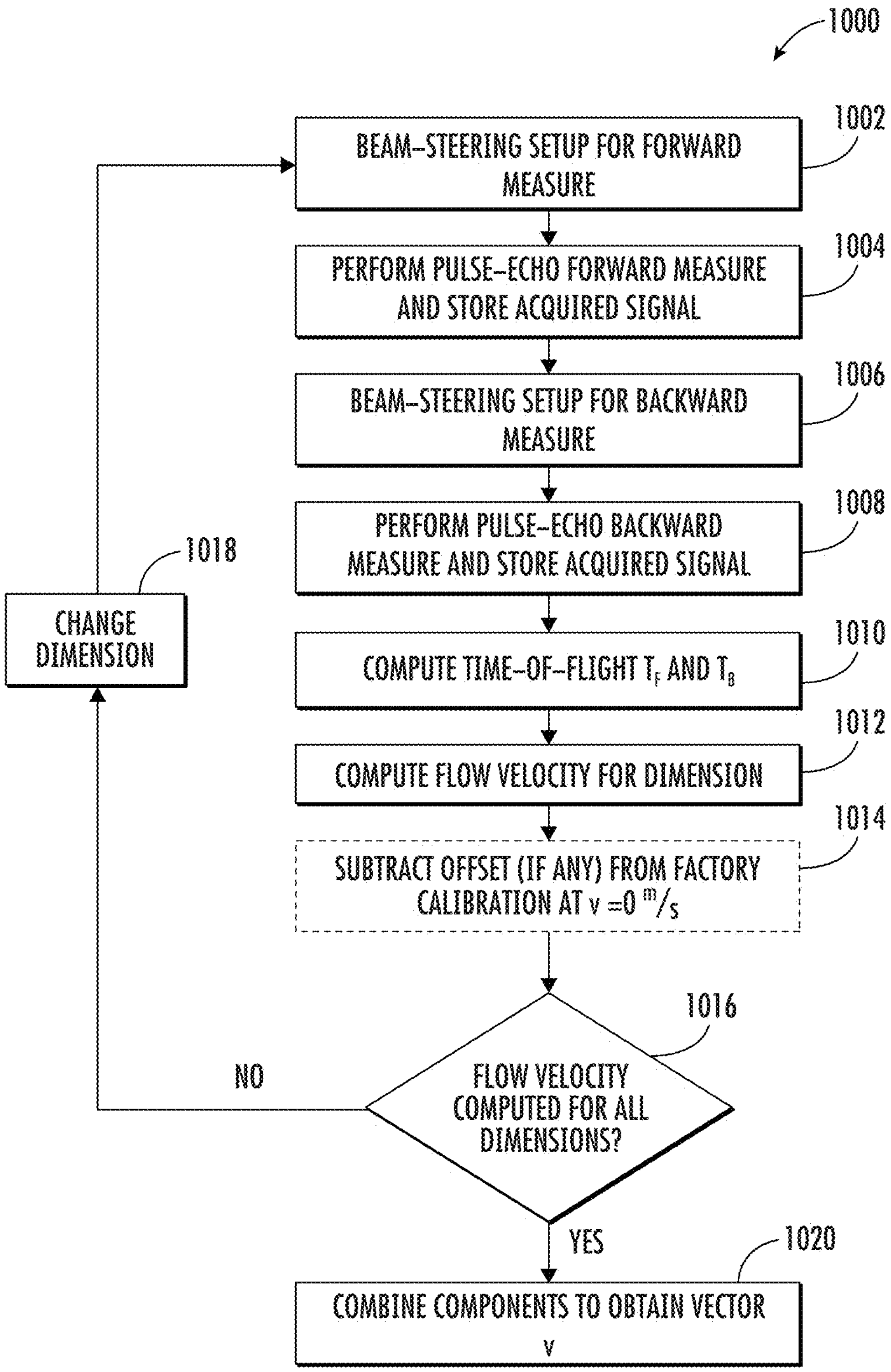
FIG. 10 provides an example flow diagram illustrating an example method for determining a velocity of a fluid, in accordance with some embodiments of the present disclosure.

Reference will now be made to FIG. 10 which provides a flowchart illustrating example steps, processes, procedures, and/or operations in accordance with various embodiments of the present disclosure. Various methods described herein, including, for example, example methods as shown in FIG. 10, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 10 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 10, an example flow diagram illustrating an example method 1000 for determining a velocity of a fluid in accordance with some embodiments of the present disclosure is illustrated. In some embodiments, the example method 1000 may be implemented by an example flow meter described herein, including, but not limited to, the example flow meters described above in connection with FIGS. 3-6 and 8.

The example method 1000 shown in FIG. 10 starts at step/operation 1002. At step/operation 1002, a processor (such as, but not limited to, the processing circuitry 102 of the flow meter 100 described above in connection with FIG. 1) performs a beam-steering setup for a forward ultrasound signal ToF measurement in a first dimension (e.g., through a first duct). In various embodiments, the beam-steering setup comprises determining the desired direction of the ultrasound signal to be transmitted. In various embodiments, the desired direction of the ultrasound signal to be transmitted depends on which dimension/duct is to be measured, the position of the duct to be measured, and whether the ultrasound signal to be transmitted is a forward signal or a backward signal.

At step/operation 1004, a processor (such as, but not limited to, the processing circuitry 102 of the flow meter 100 described above in connection with FIG. 1) in conjunction with a steerable transducer array (such as, but not limited to, the transducer array 110 of the flow meter 100 described above in connection with FIG. 1) performs a pulse-echo forward ToF measure. That is, a forward ultrasound signal is transmitted by the ultrasound array toward the desired duct, reflected through the duct and back to the ultrasound array where the signal is received. In various embodiments, the time the forward signal was transmitted and the time the forward signal was received are captured and saved for use in computing forward ToF.

At step/operation 1006, a processor (such as, but not limited to, the processing circuitry 102 of the flow meter 100 described above in connection with FIG. 1) performs a beam-steering setup for a backward ultrasound signal ToF measurement in a first dimension (e.g., through the first duct). In various embodiments, the beam-steering setup comprises determining the desired direction of the ultrasound signal to be transmitted. In various embodiments, the desired direction of the ultrasound signal to be transmitted depends on which dimension/duct is to be measured, the position of the duct to be measured, and whether the ultrasound signal to be transmitted is a forward signal or a backward signal.

At step/operation 1008, a processor (such as, but not limited to, the processing circuitry 102 of the flow meter 100 described above in connection with FIG. 1) in conjunction with a steerable transducer array (such as, but not limited to, the transducer array 110 of the flow meter 100 described above in connection with FIG. 1) performs a pulse-echo backward ToF measure. That is, a backward ultrasound signal is transmitted by the ultrasound array toward the desired duct, reflected through the duct and back to the ultrasound array where the signal is received. In various embodiments, the time the backward signal was transmitted and the time the backward signal was received are captured and saved for use in computing backward ToF.

At step/operation 1010, a processor (such as, but not limited to, the processing circuitry 102 of the flow meter 100 described above in connection with FIG. 1) calculates the forward ToF ($T_F$) based on the difference between the time the forward signal was received and the time the forward signal was transmitted and calculates the backward ToF ($T_B$) based on the difference between the time the backward signal was received and the time the backward signal was transmitted.

At step/operation 1012, a processor (such as, but not limited to, the processing circuitry 102 of the flow meter 100 described above in connection with FIG. 1) calculates the flow velocity for the desired dimension based on the forward ToF and the backward ToF. In various embodiments, any suitable method may be used to calculate the flow velocity based on the forward ToF and the backward ToF.

For example, in some embodiments, the flow velocity may be calculated based on the forward ToF and the backward ToF using this equation:

$$v = \frac{d_f}{2\cos(\alpha)} \cdot \left(\frac{1}{T_F - t_n} - \frac{1}{T_B - t_n}\right);$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, a is an angle between a direction of a corresponding one of the first ultrasound signal, the third ultrasound signal, or the fifth ultrasound signal and the corresponding duct direction, $T_F$ is a corresponding one of the ToF of the first ultrasound signal, the ToF of the third ultrasound signal, or the ToF of the fifth ultrasound signal, $T_B$ is a corresponding one of the ToF of the second ultrasound signal, the ToF of the fourth ultrasound signal, or the ToF of the sixth ultrasound signal, and $t_n$ is a travel time of a corresponding one of the first ultrasound signal, the third ultrasound signal, or the fifth ultrasound signal within a corresponding one of the first duct, the second duct, or the third duct.

In another example, in some embodiments, the flow velocity may be calculated based on the forward ToF and the backward ToF using this equation:

$$v = \frac{c^2(T_B - T_F)}{2d_f \cdot \cos(\alpha)};$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, α is an angle between a direction of a corresponding one of the first ultrasound signal, the third ultrasound signal, or the fifth ultrasound signal and the corresponding duct direction, Tr is a corresponding one of the ToF of the first ultrasound signal, the ToF of the third ultrasound signal, or the ToF of the fifth ultrasound signal, $T_B$ is a corresponding one of the ToF of the second ultrasound signal, the ToF of the fourth ultrasound signal, of the ToF of the sixth ultrasound signal, and c is a speed of sound.

At step/operation 1014, a processor (such as, but not limited to, the processing circuitry 102 of the flow meter 100 described above in connection with FIG. 1) optionally subtracts an offset (if any) determined during factory or field calibration from the calculated flow velocity. An offset may be present due to manufacturing tolerances or limitations in the beamformer electronics, resulting in a slightly different length of the path taken by the acoustic wave in the forward and backward directions. This may result in having a ToF difference ($T_B$–$T_F$) different from zero where fluid/air flow is zero. The offset can be determined by performing the method 1000, in particular steps 1002 to 1012, after the whole system is assembled, in a controlled condition where there is no flow, for example by enclosing the system in a box.

At step/operation 1016, a processor (such as, but not limited to, the processing circuitry 102 of the flow meter 100 described above in connection with FIG. 1) determines if a flow velocity has been computed for all dimensions (i.e., calculated for two dimensions in a 2-D flow meter or calculated for three dimensions in a 3-D flow meter).

If it is determined at step/operation 1016 that a flow velocity has not been computed for all dimensions, the method 1000 proceeds to step/operation 1018. At step/operation 1018, a processor (such as, but not limited to, the processing circuitry 102 of the flow meter 100 described above in connection with FIG. 1) changes the dimension/duct to the next desired dimension/duct. For example, if a flow velocity has been calculated for a first dimension/duct, at step/operation 1018 a second dimension/duct is selected. Similarly, if a flow velocity has been calculated for a first and second dimension/duct, at step/operation 1018 a third dimension/duct is selected. From step/operation 1018, the method 1000 repeats steps/operations 1002-1016 until a flow velocity has been calculated for all dimensions/ducts.

If it is determined at step/operation 1016 that a flow velocity has been computed for all dimensions, the method 1000 proceeds to step/operation 1020. At step/operation 1020, a processor (such as, but not limited to, the processing circuitry 102 of the flow meter 100 described above in connection with FIG. 1) combines the flow velocities calculated for all dimensions into a velocity vector. The "v" resulting from formulas described above is the velocity vector projection along the direction of the duct (i.e., the line connecting the centers of the two mirrors of the same channel). The obtained "v"s are therefore the velocity vector components in a coordinate system where the axes are defined by these directions. This may be referred to as a "local reference frame." For the embodiments illustrated herein, the local reference frame is orthogonal. It is not mandatory that the local reference frame be orthogonal, but it simplifies the computation. In some embodiments, a conversion may be useful to express the velocity vector in a more convenient coordinate system or formalism (e.g., Euler angles, quaternions, etc.). Which one is the most convenient, depends on application, and may also change during the operative life of the device.

In various embodiments, the example method 1000 may run continuously on the flow meter, the example method 1000 may run periodically (e.g., on a predetermined schedule) on the flow meter, or the example method 1000 may run only when, for example, a velocity determination is requested.

In various embodiments, the velocity vector determined at step/operation 1020 is displayed on a display associated with the flow meter, transmitted to a user device for display, and/or transmitted to a data storage device for retention.

CONCLUSION

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

While this detailed description has set forth some embodiments of the present disclosure, the appended claims cover other embodiments of the present disclosure which differ from the described embodiments according to various modifications and improvements. For example, the appended claims can cover any form of device which measures a flow of a fluid in one, two, or three dimensions.

Within the appended claims, unless the specific term “means for” or “step for” is used within a given claim, it is not intended that the claim be interpreted under 35 U.S.C. 112, paragraph 6.

What is claimed is:

1. A flow meter for determining a velocity of a fluid, the flow meter comprising:

a single-die steerable transducer array;

a first duct defining a first channel and having a first reflector at a first end and a second reflector at a second end;

a second duct defining a second channel and having a first reflector at a first end and a second reflector at a second end; and a controller configured to:

(a) direct the transducer array to (1) transmit a first ultrasound signal toward the first reflector of the first duct such that the first ultrasound signal is reflected by the first reflector of the first duct, travels through the first channel toward the second reflector of the first duct, is reflected by the second reflector of the first duct toward the transducer array, and is received by the transducer array, (2) transmit a second ultrasound signal toward the second reflector of the first duct such that the second ultrasound signal is reflected by the second reflector of the first duct, travels through the first channel toward the first reflector of the first duct, is reflected by the first reflector of the first duct toward the transducer array, and is received by the transducer array, (3) transmit a third ultrasound signal toward the first reflector of the second duct such that the third ultrasound signal is reflected by the first reflector of the second duct, travels through the second channel toward the second reflector of the second duct, is reflected by the second reflector of the second duct toward the transducer array, and is received by the transducer array, and (4) transmit a fourth ultrasound signal toward the second reflector of the second duct such that the fourth ultrasound signal is reflected by the second reflector of the second duct, travels through the second channel toward the first reflector of the second duct, is reflected by the first reflector of the second duct toward the transducer array, and is received by the transducer array;

(b) calculate a time of flight (ToF) of the first ultrasound signal, a time of flight (ToF) of the second ultrasound signal, a time of flight (ToF) of the third ultrasound signal, and a time of flight (ToF) of the fourth ultrasound signal;

(c) calculate a velocity of the fluid in a first dimension using the ToF of the first ultrasound signal and the ToF of the second ultrasound signal; and (d) calculate a velocity of the fluid in a second dimension using the ToF of the third ultrasound signal and the ToF of the fourth ultrasound signal.

2. The flow meter of claim 1, wherein the first duct and the second duct are positioned at 90 degrees to each other.

3. The flow meter of claim 1, wherein the first duct and the second duct intersect along a length of one or both of the first duct and the second duct or intersect at corresponding ends of each of the first duct and the second duct.

4. The flow meter of claim 1, further comprising a third duct defining a third channel and having a first reflector at a first end and a second reflector at a second end;

wherein the controller is further configured to:

(a) direct the transducer array to (1) transmit a fifth ultrasound signal toward the first reflector of the third duct such that the fifth ultrasound signal is reflected by the first reflector of the third duct, travels through the third channel toward the second reflector of the third duct, is reflected by the second reflector of the third duct toward the transducer array, and is received by the transducer array, and (2) transmit a sixth ultrasound signal toward the second reflector of the third duct such that the sixth ultrasound signal is reflected by the second reflector of the third duct, travels through the third channel toward the first reflector of the third duct, is reflected by the first reflector of the third duct toward the transducer array, and is received by the transducer array;

(b) calculate a time of flight (ToF) of the fifth ultrasound signal and a time of flight (ToF) of the sixth ultrasound signal; and (c) calculate a velocity of the fluid in a third dimension using the ToF of the fifth ultrasound signal and the ToF of the sixth ultrasound signal.

5. The flow meter of claim 4, wherein the first duct, the second duct, and the third duct are positioned substantially orthogonal to each other in three-dimensional space.

6. The flow meter of claim 4, wherein the first duct, the second duct, and the third duct intersect at corresponding ends of each of the first duct, the second duct, and the third duct.

7. The flow meter of claim 6, wherein the first duct, the second duct, and the third duct all have a different length.

8. The flow meter of claim 4, wherein the controller is further configured to combine the calculated velocity of the fluid in the first dimension, the calculated velocity of the fluid in the second dimension, and the calculated velocity of the fluid in the third dimension to determine a three-dimensional velocity vector of the fluid.

9. The flow meter of claim 4, wherein the controller calculates the velocity of the fluid in the first dimension, the velocity of the fluid in the second dimension, and the velocity of the fluid in the third dimension using equation:

$$v = \frac{d_f}{2\cos(\alpha)} \cdot \left(\frac{1}{T_F - t_n} - \frac{1}{T_B - t_n}\right);$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, α is an angle between a direction of a corresponding one of the first ultrasound signal, the third ultrasound signal, or the fifth ultrasound signal and a direction of, a corresponding one of the first duct, the second duct, or the third duct, $T_F$ is a corresponding one of the ToF of the first ultrasound signal, the ToF of the third ultrasound signal, or the ToF of the fifth ultrasound signal, $T_B$ is a corresponding one of the ToF of the second ultrasound signal, the ToF of the fourth ultrasound signal, or the ToF of the sixth ultrasound signal, and $t_n$ is a travel time of a corresponding one of the first ultrasound signal, the third ultrasound signal, or the fifth ultrasound signal within a corresponding one of the first duct, the second duct, or the third duct.

10. The flow meter of claim 4, wherein the controller calculates the velocity of the fluid in the first dimension, the velocity of the fluid in the second dimension, and the velocity of the fluid in the third dimension using equation:

$$v = c^2(T_B - T_F)/2d_f \cdot \cos(\alpha);$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, α is an angle between a direction of a corresponding one of the first ultrasound signal, the third ultrasound signal, or the fifth ultrasound signal and a direction of a corresponding one of the first duct, the second duct, or the third duct, $T_F$ is a corresponding one of the ToF of the first ultrasound signal, the ToF of the third ultrasound signal, or the ToF of the fifth ultrasound signal, $T_B$ is a corresponding one of the ToF of the second ultrasound signal, the ToF of the fourth ultrasound signal, or the ToF of the sixth ultrasound signal, and c is a speed of sound.

11. A method of determining a velocity of a fluid, the method comprising:

transmitting, by single-die steerable transducer array, a first ultrasound signal toward a first reflector of a first duct defining a first channel such that the first ultrasound signal is reflected by the first reflector of the first duct, travels through the first channel toward a second reflector of the first duct, is reflected by the second reflector of the first duct toward the transducer array, and is received by the transducer array;

transmitting, by the transducer array, a second ultrasound signal toward the second reflector of the first duct such that the second ultrasound signal is reflected by the second reflector of the first duct, travels through the first channel toward the first reflector of the first duct, is reflected by the first reflector of the first duct toward the transducer array, and is received by the transducer array;

transmitting, by the transducer array, a third ultrasound signal toward a first reflector of a second duct defining a second channel such that the third ultrasound signal is reflected by the first reflector of the second duct, travels through the second channel toward a second reflector of the second duct, is reflected by the second reflector of the second duct toward the transducer array, and is received by the transducer array;

transmitting, by the transducer array, a fourth ultrasound signal toward the second reflector of the second duct such that the fourth ultrasound signal is reflected by the second reflector of the second duct, travels through the second channel toward the first reflector of the second duct, is reflected by the first reflector of the second duct toward the transducer array, and is received by the transducer array;

calculating, by a controller, a time of flight (ToF) of the first ultrasound signal, a time of flight (ToF) of the second ultrasound signal, a time of flight (ToF) of the third ultrasound signal, and a time of flight (ToF) of the fourth ultrasound signal;

calculating, by the controller, a velocity of the fluid in a first dimension using the ToF of the first ultrasound signal and the ToF of the second ultrasound signal; and calculating, by the controller, a velocity of the fluid in a second dimension using the ToF of the third ultrasound signal and the ToF of the fourth ultrasound signal.

12. The method of claim 11, wherein the first duct and the second duct are positioned at 90 degrees to each other.

13. The method of claim 11, wherein the first duct and the second duct intersect along a length of one or both of the first duct and the second duct or intersect at corresponding ends of each of the first duct and the second duct.

14. The method of claim 11, further comprising:

transmitting, by the transducer array, a fifth ultrasound signal toward a first reflector of a third duct defining a third channel such that the fifth ultrasound signal is reflected by the first reflector of the third duct, travels through the third channel toward a second reflector of the third duct, is reflected by the second reflector of the third duct toward the transducer array, and is received by the transducer array;

transmitting, by the transducer array, a sixth ultrasound signal toward the second reflector of the third duct such that the sixth ultrasound signal is reflected by the second reflector of the third duct, travels through the third channel toward the first reflector of the third duct, is reflected by the first reflector of the third duct toward the transducer array, and is received by the transducer array;

calculating, by the controller, a time of flight (ToF) of the fifth ultrasound signal and a time of flight (ToF) of the sixth ultrasound signal; and calculating, by the controller, a velocity of the fluid in a third dimension using the ToF of the fifth ultrasound signal and the ToF of the sixth ultrasound signal.

15. The method of claim 14, wherein the first duct, the second duct, and the third duct are positioned substantially orthogonal to each other in three-dimensional space.

16. The method of claim 14, wherein the first duct, the second duct, and the third duct intersect at corresponding ends of each of the first duct, the second duct, and the third duct.

17. The method of claim 16, wherein the first duct, the second duct, and the third duct all have a different length.

18. The method of claim 14, further comprising:

combining, by the controller, the calculated velocity of the fluid in the first dimension, the calculated velocity of the fluid in the second dimension, and the calculated velocity of the fluid in the third dimension to determine a three-dimensional velocity vector of the fluid.

19. The method of claim 14, wherein the controller calculates the velocity of the fluid in the first dimension, the velocity of the fluid in the second dimension, and the velocity of the fluid in the third dimension using equation:

$$v = \frac{d_f}{2\cos(\alpha)} \cdot \left( \frac{1}{T_F - t_n} - \frac{1}{T_B - t_n} \right);$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, α is an angle between a direction of a corresponding one of the first ultrasound signal, the third ultrasound signal, or the fifth ultrasound signal and a direction of a corresponding one of the first duct, the second duct, or the third duct, Tr is a corresponding one of the ToF of the first ultrasound signal, the ToF of the third ultrasound signal, or the ToF of the fifth ultrasound signal, $T_B$ is a corresponding one of the ToF of the second ultrasound signal, the ToF of the fourth ultrasound signal, or the ToF of the sixth ultrasound signal, and $t_n$ is a travel time of a corresponding one of the first ultrasound signal, the third ultrasound signal, or the fifth ultrasound signal within a corresponding one of the first duct, the second duct, or the third duct.

20. The method of claim 14, wherein the controller calculates the velocity of the fluid in the first dimension, the velocity of the fluid in the second dimension, and the velocity of the fluid in the third dimension using equation:

$$v = \frac{c^2(T_B - T_F)}{2d_f \cdot \cos(\alpha)};$$

where v is the velocity to be calculated, $d_f$ is a distance travelled by a corresponding one of the first ultrasound signal, the third ultrasound signal, or the fifth ultrasound signal outside of a corresponding one of the first duct, the second duct, or the third duct, α is an angle between a direction of a corresponding one of the first ultrasound signal, the third ultrasound signal, or the fifth ultrasound signal and a direction of a corresponding one of the first duct, the second duct, or the third duct, $T_F$ is a corresponding one of the ToF of the first ultrasound signal, the ToF of the third ultrasound signal, or the ToF of the fifth ultrasound signal, $T_B$ is a corresponding one of the ToF of the second ultrasound signal, the ToF of the fourth ultrasound signal, or the ToF of the sixth ultrasound signal, and c is a speed of sound.

* * * * *